(12) United States Patent
Yadhav et al.

(10) Patent No.: US 11,016,685 B2
(45) Date of Patent: May 25, 2021

(54) METHOD AND DEFRAGMENTATION MODULE FOR DEFRAGMENTING RESOURCES

(71) Applicant: Telefonaktiebolaget LM Ericsson (publ), Stockholm (SE)

(72) Inventors: Vinay Yadhav, Upplands Väsby (SE); Daniel Turull, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 153 days.

(21) Appl. No.: 16/488,932

(22) PCT Filed: Feb. 27, 2017

(86) PCT No.: PCT/SE2017/050181
§ 371 (c)(1),
(2) Date: Aug. 26, 2019

(87) PCT Pub. No.: WO2018/156062
PCT Pub. Date: Aug. 30, 2018

(65) Prior Publication Data
US 2020/0004421 A1 Jan. 2, 2020

(51) Int. Cl.
*G06F 12/00* (2006.01)
*G06F 3/06* (2006.01)
*G06F 9/50* (2006.01)

(52) U.S. Cl.
CPC ............. *G06F 3/064* (2013.01); *G06F 3/067* (2013.01); *G06F 3/0616* (2013.01);
(Continued)

(58) Field of Classification Search
CPC ........ G06F 3/064; G06F 3/0616; G06F 3/067; G06F 9/5011; G06F 9/5072; G06F 2206/1004; G06F 9/5061
See application file for complete search history.

(56) References Cited

U.S. PATENT DOCUMENTS 8,874,749 B1 10/2014 Vittal et al.
2012/0284484 A1 11/2012 Abdul et al.
(Continued)

FOREIGN PATENT DOCUMENTS

WO 2008142137 A1 11/2008

OTHER PUBLICATIONS

International Search Report and Written Opinion of Application No. PCT/SE2017/050181, dated Nov. 24, 2017, 12 pages.
(Continued)

*Primary Examiner* — Jason W Blust
(74) *Attorney, Agent, or Firm* — NDWE LLP

(57) ABSTRACT

A method and a defragmentation module for defragmenting resources of a hardware system. The defragmentation module identifies a set of structures. Each structure of the set of structures partially hosts a respective set of host machines. Respective resources of each host machine of the respective set of host machines are allocated in at least two structures of the set of structures. The defragmentation module selects, from the respective resources of a host machine of the respective set of host machine, a remote resource of a first structure being different from a second structure partially hosting the host machine. A remote amount of the remote resource is less than an amount of available resources of the second structure. The defragmentation module assigns the remote amount of the available resources of the second structure to the host machine instead of the remote resource.

14 Claims, 5 Drawing Sheets

(52) U.S. Cl.
CPC .......... *G06F 9/5011* (2013.01); *G06F 9/5072* (2013.01); *G06F 2206/1004* (2013.01)

(56) References Cited

U.S. PATENT DOCUMENTS

| | | |
|---|---|---|
| 2012/0331147 A1 | 12/2012 | Dutta et al. |
| 2013/0145073 A1 | 6/2013 | Tuch et al. |
| 2016/0103699 A1 | 4/2016 | Thakkar et al. |
| 2016/0188375 A1 | 6/2016 | Kozloski et al. |

OTHER PUBLICATIONS

Prasad Calyam et al., "Resource Defragmentation Using Market-Driven Allocation in Virtual Desktop Clouds," 2015, pp. 246-255, IEEE International Conference on Cloud Engineering.

Ganesha Shanmuganathan et al., "Defragmenting the Cloud Using Demand-based Resource Allocation," Jun. 17, 2013, pp. 67-80, ACM Measurement and Modeling of Computer Systems.

Mukundan Sridharan et al., "Defragmentation of Resources in Virtual Desktop Clouds for Cost-Aware Utility-Optimal Allocation," Dec. 5, 2011, 8 pages, 2011 Fourth IEEE International Conference on Utility and Cloud Computing (UCC).

Jim Ng et al., "Defragmentation for Efficient Runtime Resource Management in NoC-Based Many-Core Systems," Nov. 2016, pp. 3359-3372, IEEE Transactions on Very Large Scale Integration (VLSI) Systems, vol. 24, No. 11.

Xiaohang Wang et al., "On runtime adaptive tile defragmentation for resource management in many-core systems," 2016, pp. 161-174, Microprocessors and Microsystems 46, Elsevier B.V.

International Preliminary Report on Patentability of Application No. PCT/SE2017/050181, dated Sep. 6, 2019, 8 pages.

METHOD AND DEFRAGMENTATION MODULE FOR DEFRAGMENTING RESOURCES

CROSS-REFERENCE TO RELATED APPLICATIONS

This application is a National stage of International Application No. PCT/SE2017/050181, filed Feb. 27, 2017, which is hereby incorporated by reference.

TECHNICAL FIELD

Embodiments herein relate to computer systems, such as cloud computing systems, data centers, computer halls, hardware systems or the like. In particular, a method and a defragmentation module for defragmenting resources of a hardware system are disclosed. A corresponding computer program and a computer program carrier are also disclosed.

BACKGROUND

Computer systems are formed by hardware and software architectures. Hardware architectures deal with how different resources, such as processing power, memory, networking interface and the like, are interconnected to, e.g. in terms of physical formats, number of wires, each other. Software architectures deal with how different programs, such as operating systems, applications, applets, virtual machines and more, are executed on the hardware architecture.

Traditional hardware architectures, used for e.g. a data center, a cloud computing system, are typically built up by a plurality of racks, such as cabinets, that are networked together. Each rack comprises one or more fully functional computers, e.g. embodied as one or more server blades. Hence, each server blade is self-contained with resources, such as processors, memory, storage units, networking interface and Input/Output (I/O) peripherals. An issue with a server blade is its static nature with regard to composition of resources. This implies that once the server blade has been assembled, processing capacity, memory capacity, network interface capacity etc. cannot be upgraded without physical intervention with the server blade, e.g. memory capacity could be upgraded by manually inserting more memory into the server blade.

In order to solve this issue, and other issues, disaggregated hardware architectures have emerged. A disaggregated hardware architecture, such as Intel Rack Scale architecture and HyperScale Datacenter Systems, separates the resources which with the traditional hardware architecture would have been confined within one blade that make up a hardware machine, such a server. The separated resources are typically organized into e.g. blades where each blade mainly includes only one of processors, memories, networking interfaces and the like. Then, a host machine is allocated by selecting resources from one or more blades. In some cases, the disaggregated hardware system may comprise a mixture of conventional self-contained blades and blades mainly including only one of processors, memories, networking interfaces and the like.

An exemplifying known disaggregated hardware system 1 is shown in FIG. 1. The known disaggregated hardware system 1 comprises an interconnect 2, such as a superfast optical fiber connectivity. The interconnect 2 interconnects a Central Processing Unit (CPU) rack 3, a memory rack 4 and a storage rack 5. The memory rack 4 may refer to short-term memories, such as cache memory or the like, whereas the storage rack 5 may refer to long-term storage, such as hard drives, magnetic tape, etc. Here, long-term and short-term shall be considered in relation to each other. Typically, each rack comprises one or more blades. With this set up, e.g. the CPU rack 3 and the storage rack 5 will be available also during replacement of the memory rack 4, while it may be assumed that other memory racks (not shown) may support, at least during the replacement, any need of memory that the CPU rack 3 and the storage rack 5 may have. The CPU rack 3 comprises CPUs, the memory rack 4 comprises memory units, and the storage rack 5 comprises disk units, all shown as rectangles in their respective rack. A Host Machine Manager 6 handles assignment of resources, such as CPU, memory and storage, to host machines. In this example, three host machines 10, 20 and 30 and their respective resources are illustrated in the Figure.

When the Host Machine Manager 6 picks a first host machine 10 and a second host machine 30, as shown in FIG. 1, the Host Machine Manager 6 selects resources from among available resources in the different racks. The host machines that are allocated by the Host Machine Manager 6 may have different requirements, e.g. in terms of number of CPUs, memories and the like. Therefore, as time goes by when the Host Machine Manager 6 allocates and deallocates host machines in the disaggregated hardware system 1, resources of the disaggregated hardware system 1 become defragmented. As an example of how defragmentation may occur, two host machines with 4 CPUs each are allocated. Assume that all these 8 CPUs are allocated in sequence next to some non-available resources. Now, when the Host Machine Manager 6 deallocates one of these host machines, i.e. the one associated with the first four of these 8 CPUs, there will be a gap among the CPUs of the disaggregated hardware system 1. The Host Machine Manager 6 then allocates a further host machine with only 3 CPUs to 3 CPUs of the 4 CPUs available in the gap. As a result, one single CPU is available as a fragment between the allocated host machines. When allocating further host machine it may be difficult for the Host Machine Manager 6 to make use of the single available CPU. These kinds of gaps, holes or fragments may occur in any resource of the disaggregated hardware system 1.

Now returning to the traditional hardware architecture, the storage units are typically disks, such as magnetic hard disks or the like. During use of these hard disks, it is known that defragmentation occurs. There exist many known methods of reducing defragmentation of hard disks. However, the known methods only address hard disk defragmentation within one single disk.

A problem may thus be how to defragment resources of e.g. the disaggregated hardware system mentioned above.

SUMMARY

An object may be to at least reduce defragmentation of resources in a hardware system, such as the aforementioned disaggregated hardware system, and thus mitigate performance degradation caused by defragmentation.

According to an aspect, the object is achieved by a method, performed by a defragmentation module, for defragmenting resources of a hardware system. The hardware system comprises structures for holding the resources. The defragmentation module identifies a set of structures. Each structure of the set of structures partially hosts a respective set of host machines. Respective resources of each host machine of the respective set of host machines are allocated in at least two structures of the set of structures.

The defragmentation module selects, from the respective resources of a host machine of the respective set of host machine, a remote resource of a first structure being different from a second structure partially hosting the host machine. A remote amount of the remote resource is less than an amount of available resources of the second structure. The defragmentation module assigns the remote amount of the available resources of the second structure to the host machine instead of the remote resource.

According to another aspect, the object is achieved by a defragmentation module configured for defragmenting resources of a hardware system. The hardware system comprises structures for holding the resources. The defragmentation module is configured for identifying a set of structures. Each structure of the set of structures partially hosts a respective set of host machines. Respective resources of each host machine of the respective set of host machines are allocated in at least two structures of the set of structures. The defragmentation module is configured for selecting, from the respective resources of a host machine of the respective set of host machine, a remote resource of a first structure being different from a second structure partially hosting the host machine. A remote amount of the remote resource is less than an amount of available resources of the second structure. Furthermore, the defragmentation module is configured for assigning the remote amount of the available resources of the second structure to the host machine instead of the remote resource.

According to further aspects, the object is achieved by a computer program and a computer program carrier corresponding to the aspects above.

The defragmentation module identifies the set of structures having partially hosted host machines in order to find out which host machines may benefit from being defragmented. Then, the defragmentation module selects the remote resource of the first structure being different from the second structure partially hosting the host machine. A remote amount of the remote resource is less than an amount of available resources of the second structure. In this manner, the defragmentation module checks that the remote resource, which is to be migrated, fits within the amount of available resources of the second structure. Then, the defragmentation module assigns the remote amount of the available resources of the second structure to the host machine instead of the remote resource, i.e. the remote resource is migrated to the second structure, whereby the remote resource is consolidated with other resources of the host machine.

In this manner, resources of the host machine are moved such that the number of structures over which said resources are spread is reduced. As a result, e.g. latency between resources of the host machine may be reduced. Hence, by placing the resources of the host machine into a lesser number of structures, communication delay and bandwidth across structures may be reduced. Thereby, improved performance of the host machine may be ensured.

By way of moving, or migrating, the resources, gaps or holes where available resources may be found are reduced. This makes allocation of host machines more prone to be successful, since contiguous resources fulfilling latency requirements for a host machine to be allocated may be found easier as compared to without the defragmentation as proposed herein. This means that consolidation of resources in the structure for holding resources results in higher availability of contiguous resources which may facilitate and/or enable success of further requests for allocation of new host machines with certain performance requirements.

An advantage is hence that utilization of resources may be increased, i.e. number of resources that are allocated to some host machine may be increased.

A further advantage may be that some structures for holding resource may be deactivated, e.g. shut down, to reduce power consumption. This may be possible since the resources are migrated such as to more tightly pack resources a lesser number of structure. The resources are more tightly packed since the resources are migrated together such as to reduce gaps, i.e. fragments of available resources.

A yet other advantage may be that latency between the resources may be decreased if it is assumed that latency within a structure is less than between structures. However, other factors such as type of memory and/or processor may also or alternatively affect latency between resources.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
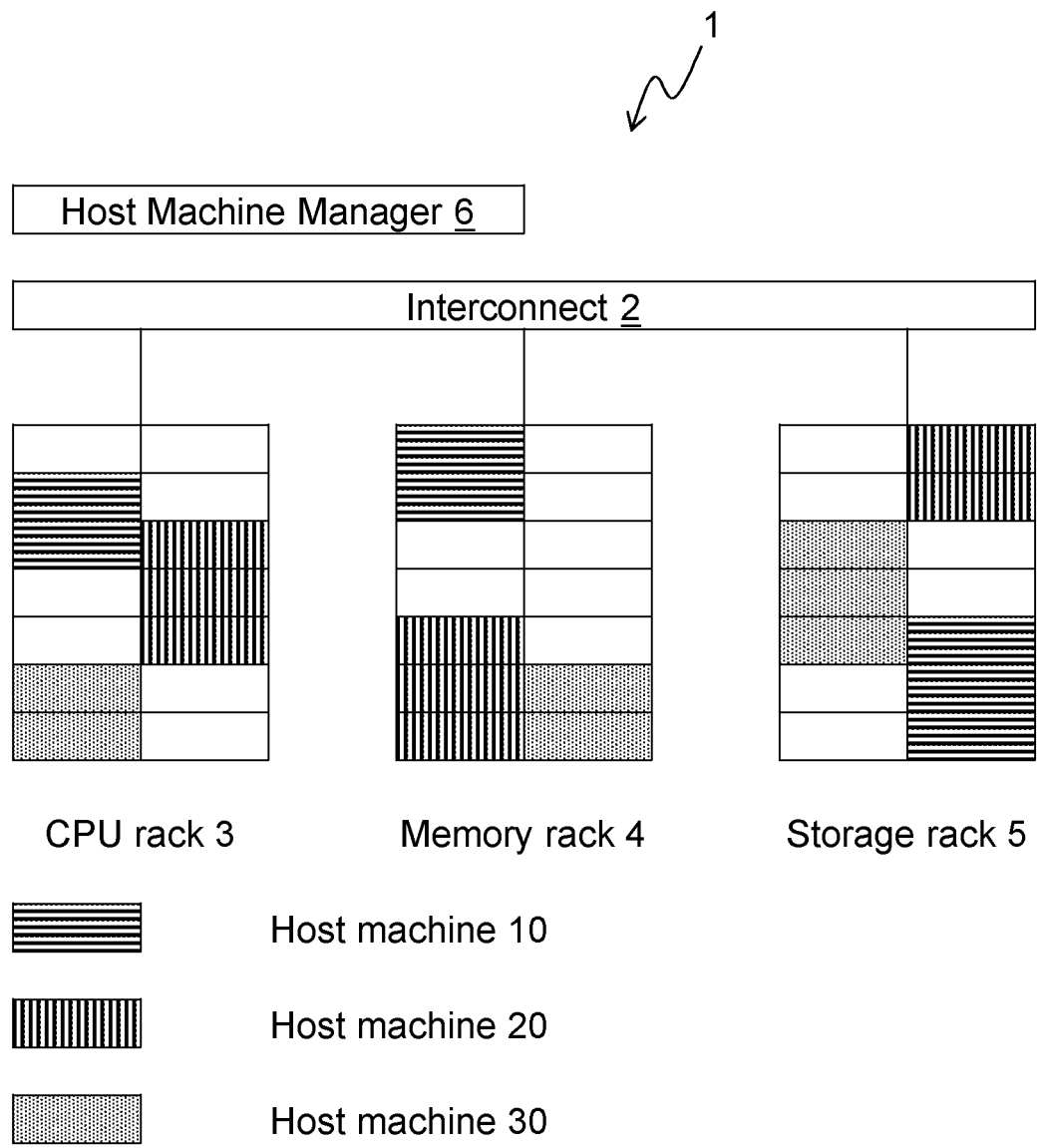
FIG. 1 is a schematic block diagram illustrating a known disaggregated hardware system.

Returning to the disaggregated hardware system mentioned in the background section, it may be noted that resources of such disaggregated hardware system are assigned to host machines. Performance of a system—as a whole—may degrade due to defragmentation of resources. E.g. system performance is degraded in that it may become difficult to assign resources to a host machine while fulfilling requirements concerning e.g. latency for the host machine.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 2:
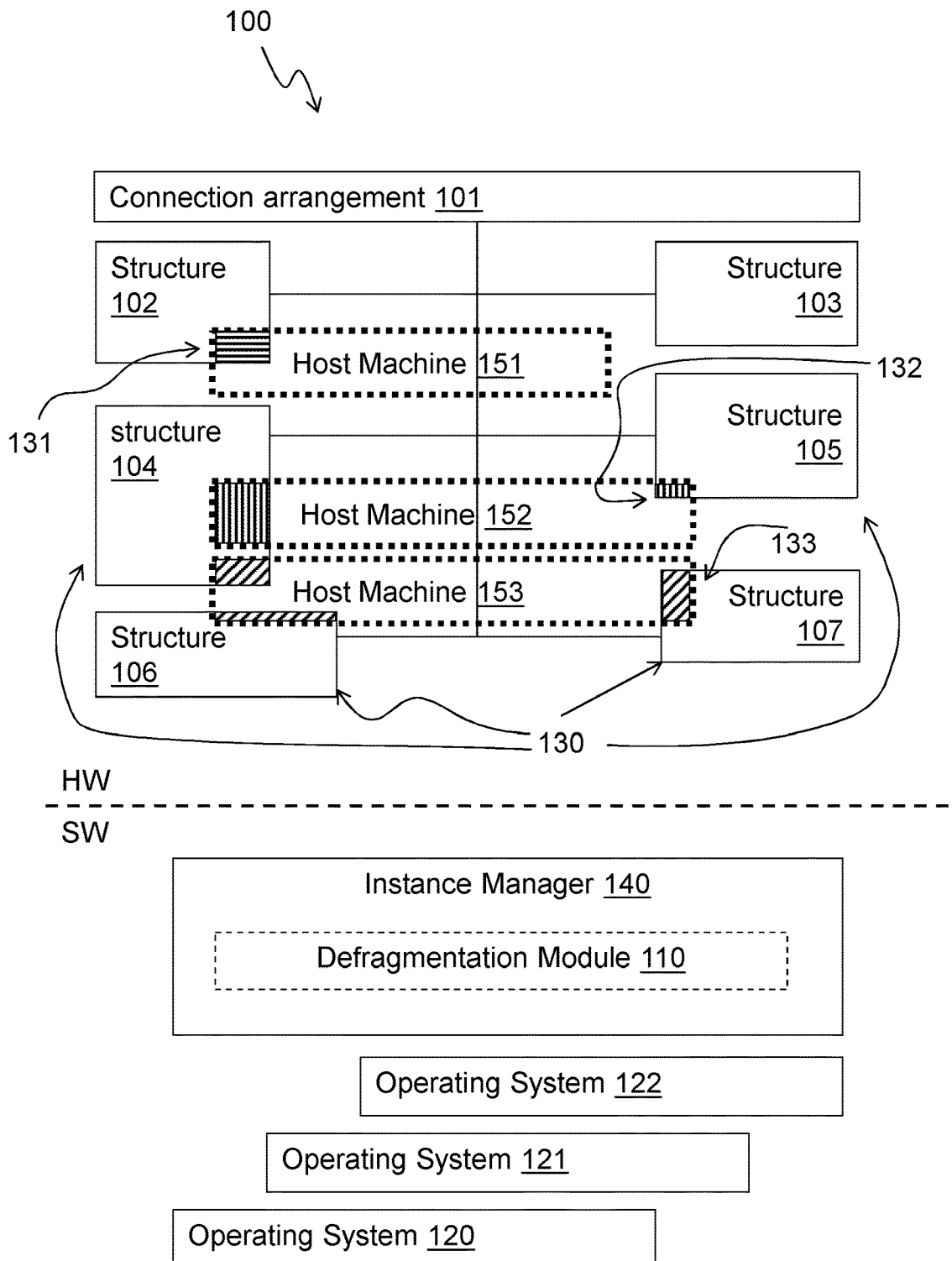
FIG. 2 is a schematic block diagram of an exemplifying hardware system in which embodiments herein may be implemented.

FIG. 2 depicts an exemplifying hardware system 100 in which embodiments herein may be implemented. The hardware system 100 may be a disaggregated hardware system.

Generally, the hardware system 100 relies on a principle of hardware resource disaggregation. The principle of hardware disaggregation considers CPU, memory and network resources as individual and modular entities, or resources. The resources are often organized in structures for holding such resources. Each structure may thus mainly hold only one type of resources, i.e. mainly only CPU, memory or another type of resource. As an example, the term "structure" may refer to a rack, a chassis, a blade, a sled, a closet, a cabinet or the like. That is, there may for instance be one or more structures for holding CPU units and one or more structures for holding memory units. The resources may also, or alternatively, be organized into many other different kinds of structures for holding resources, such as a structure for holding storage, a structure for holding network interfaces, etc. The terms "CPU structure", "memory structure" etc. will be used herein to refer to a structure for holding CPUs and a structure for holding memory units. When utilizing the hardware system 100, a host machine may be composed of a sub-set of resources within one or more structures.

The hardware system 100 may comprise a connection arrangement 101 for interconnecting a full or complete set of structures 102-107, also referred to as "resource structures". The connection arrangement 101 may be realized by optical fibers. Thus, a fast interconnection, as an example of the connection arrangement 101, between the structures 102-107 is provided.

At the software side (SW), as opposed to the hardware (HW) side described above, one or more operating systems 120, 121, 122 may be executed on a respective host machine 151, 152, 153, such a first host machine 151, a second host machine 152 and a third host machine 153. The first, second and third host machines 151, 152, 153 are different from each other.

The operating systems 120, 121, 122 may be referred to as virtual hosts, instances or the like, when executed by the hardware system 100. Each operating system 120, 121, 122 may in its turn manage one or more instances of a software application, a virtual machine, a database, a software library or the like. Accordingly, as used herein, the term "instance" may refer to an instance of a virtual host, an operating system, a software application, a virtual machine, a database, a software library or the like.

Accordingly, the hardware system 100 hosts the respective host machines 151, 152, 153. It shall here be said that a border between HW and SW is often somewhat fuzzy, since various programming languages enable implementation of a module as hardware and/or software, also a Field Programmable Gate Array (FPGA) can be seen as a half-SW and half-HW component. As indicated above, the respective host machine 151, 152, 153 may comprise one or more selected resources 131, 132, 133 from one or more structures 102-107. As an example, said one or more selected resources 131, 132, 133 may comprises a first selected resource 131, a second selected resource 132 and a third selected resource 133.

In some examples, an instance manager 140, or host machine manage, may assemble the respective host machine 151, 152, 153 by selecting a sub-set of resources within one or more structures. In this manner, a number of resources are assigned to the respective host machine 151, 152, 153. Expressed differently, each host machine includes respective resources that have been assigned to the respective host machine by the instance manager 140. In related literature, the host machine may be referred to as "logical hardware machine", "virtual hardware machine", "logical server" or the like.

As an example, the structure 102 for holding resources hosts, i.e. completely hosts, the first host machine 151. As another example, the structures 104, 105 for holding resources partially host the second host machine 152. As yet another example, the structures 104, 106, 107 for holding resources partially host the host machine 153. It shall be noted that the resource structure 104-107 may also host further host machines (not shown) that are completely hosted with respect to one resource type, such as CPU, memory, networking interface or the like.

Figure 3:
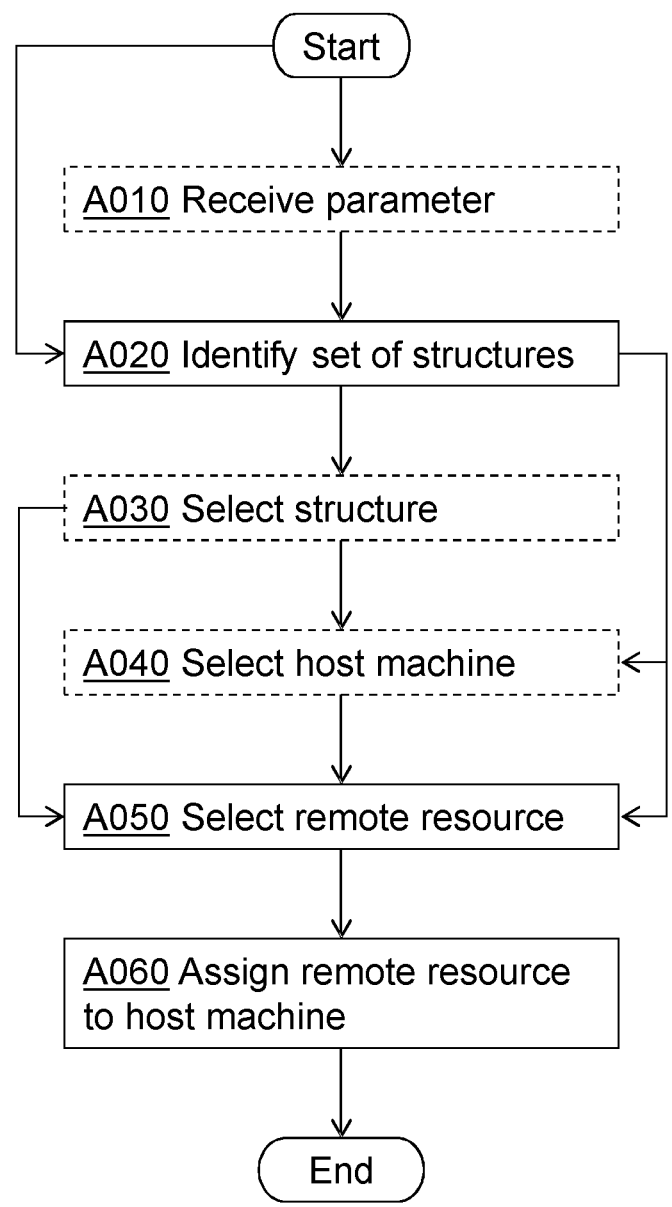
FIG. 3 is a flowchart illustrating embodiments of the method in the defragmentation module.

FIG. 3 illustrates an exemplifying method according to embodiments herein when implemented in the hardware system 100 of FIG. 1.

The defragmentation module 110 performs a method for defragmenting resources 130 of the hardware system 100. As mentioned, the hardware system 100 comprises structures 102-107 for holding the resources 130 of the hardware system 100. Again, it is noted that the structures 102-107 may be referred to as resource structures 102-107. According to the above, each structure 102-107 of the set of structures 102-107 comprises at least one of a rack, a chassis, a sledge, a blade and the like.

One or more of the following actions may be performed in any suitable order.

Action A010

In order to trigger defragmentation of resources, the defragmentation module 110 may receive a parameter indicating that defragmentation of resources is to be performed. The parameter may be received from the instance manager 140 or the like.

The parameter may indicate one or more of:
resources have been released from being assigned to any host machine,
a time interval has lapsed,
a number of deallocations of host machines have occurred,
an operator of the hardware system 100 orders the defragmentation to be performed, and
the like This means that the defragmentation may for instance be triggered when a host machine is deallocated. The triggering may be initiated manually, in a periodic way or after an event in the hardware system 100, such as after every N allocations/deallocation or the like.

Action A020

The defragmentation module 110 identifies a set of structures 104-107. Each structure 104-107 of the set of structures 104-107 partially hosts, e.g. with respect to one type of resource, a respective set of host machines 152-153. Respective resources 132-133 of each host machine 152-153 of the respective set of host machines 152-153 are allocated in at least two structures of the set of structures 104-107. Structures 102 and 103 do not partially host any host machine. Hence, these structures are not identified.

In this manner, the defragmentation module 110 may find those structures whose resources, considering one type of resource at the time, are spread over at least two structures.

Action A030

In order to find a suitable structure to which it may be appropriate to migrate resources, the defragmentation module 110 may select a second structure 104 from the set of structures 104-107 based on a set of amounts of available resources. Each amount of available resources of the set of amounts of available resources is associated with a respective structure of the set of structures.

The second structure 104 may be any structure of the set of structures 104-107, but the second structure 104 may preferably be the structure with the greatest amount of available resources. In some examples, the second structure 104 may be the structure with the second, third, fourth, fifth, etc., but greatest amount of available resources. In further examples, the second structure 104 may be selected arbitrarily.

In some examples, when the resources comprise two or more types of resources, the defragmentation module 110 may keep track of amount of available resources for each type of resource. For instance, there may be 10 available resources, e.g. 10 processors, 10 memory units etc.

In some embodiments, the resources of the hardware system 100 may comprise processing circuits and memories. In these embodiments, the defragmentation module 110 may select the second structure 104 by prioritising selection of the second structure 104 based on an amount of available processing circuits in the second structure 104 over selection of the second structure 104-107 based on an amount of available memories in the second structure 104.

Expressed differently, the selecting A030 of the second structure 104-107 may comprise prioritising selection of the second structure 104-107 based on an amount of available processing circuits in the second structure 104 over selection of the second structure 104-107 based on an amount of available memories in the second structure 104.

Action A040

In order to find a suitable host machine from which it may be appropriate to move resources, the defragmentation module 110 may select a host machine 153 from the respective set of host machines 152-153 based on at least one of:

a number of structures 102-107 in which the respective resources of the host machine 153 are allocated, and an amount of a set of remote resources taken from the respective resources of the host machine. This may mean that the amount of the set of remote resources is a sub-set of the respective resources of the host machine. Moreover, each remote resource of the set of remote resources is allocated in a sub-set of structures, wherein each structure of the sub-set of structures is different from the second structure 104.

In view of the above, the defragmentation module 110 may select the host machine whose respective resources are allocated in a greatest, or almost a greatest, number of structures 102-107. Alternatively or additionally, the defragmentation module 110 may select the host machine which has a greatest, or almost a greatest, amount of the set of remote resources.

In this context, it deserves to be mentioned that the term "remote resource(s)" shall be understood in relation to a particular structure under consideration, e.g. referred to as "first structure" below. This means that if any host machine, having resources allocated in the particular structure, also has further resources allocated in one or more structures, these further resources may be referred to as "remote resources".

Now that the term "remote resource" has been explained, it may be noted that there may normally be a latency penalty to access any remote resource. Thanks to that host machines are consolidated into one structure, or merely a few structures, by way of the present method, the latency penalty for access may also be reduced. Hence, performance of a consolidated host machine may be improved in that latency penalty is decreased.

Embodiments of action A040 may be expressed differently, i.e. the selecting A040 of the host machine may comprise at least one of:

selecting the host machine whose respective resources are allocated in a greatest, or almost a greatest, number of structures 102-107, and selecting the host machine which has a greatest, or almost a greatest, amount of the set of remote resources.

Action A050

The defragmentation module 110 selects, from the respective resources 131-133 of the host machine 151-153 of the respective set of host machine 152-153, a remote resource of a first structure being different from the second structure 104 partially hosting the host machine 151-153. The remote resource may relate to only the first structure. A remote amount of the remote resource is less than the amount of available resources of the second structure 104.

In this manner, the remote resource has been selected for migration.

The set of amounts of available resources, mentioned in action A030, may comprise the amount of available resources of the second structure 104.

It shall be noted that, for embodiments including action A040:

the set of remote resources comprises the remote resource allocated in the first structure, the amount of the set of remote resources comprises the remote amount of the remote resource, and the sub-set of structures includes the first structure.

In some examples, the defragmentation module 110 may select the remote resource based on the remote amount of the remote resource. This may mean that the selection of the remote resource is done based on the remote amount of the remote resource in comparison to remote amounts of other remote resources in other structures but the second structure 104.

The remote amount of the remote resource may be one of the least amounts of remote resources of the host machine 151-153. As an example, the remote amount of the remote resource may indicate that e.g. 2 processors of the host machine are allocated in one other structure, being different from the second structure 104.

Expressed differently, the selecting A050 of the remote resource comprises selecting the remote resource based on the remote amount of the remote resource.

Action A060

The defragmentation module 110 assigns the remote amount of the available resources of the second structure 104 to the host machine 151-153 instead of the remote resource.

In this manner, resources are migrated from the first structure to the second structure 104. In more detail, this means for example that contents of processor registries and/or contents of any memory closely related to the processor is copied and inserted into processor registries and/or into any memory closely related to a processor of the second structure 104 in case of resource structures holding computing/processing resources. Similarly, this means—in case of resource structures holding memory units that content(s) of memories of the first structure is copied and inserted into memories of the second structure 104. The resource(s) of the first structures thus migrated is normally released, i.e. the resource(s) is again available for assignment in response to any host machine request.

Said at least two structures, associated with the host machine 151-153, may comprise the first and second structures 104-105.

The available resources of the second structure 104 are available for assignment to the host machine 151-153 or any other host machine.

In this manner, assigning of the remote amount of the available resources of the second structure 104 to the host machine instead of the remote resource causes resources of the hardware system to be defragmented, i.e. less fragmented. Hence, occupied resources—as opposed to available resources—are bulked together, whereby amount of continuous available resources may increase. Occupied resources, hence, refers to resources that are assigned to some host machine.

Figure 4:
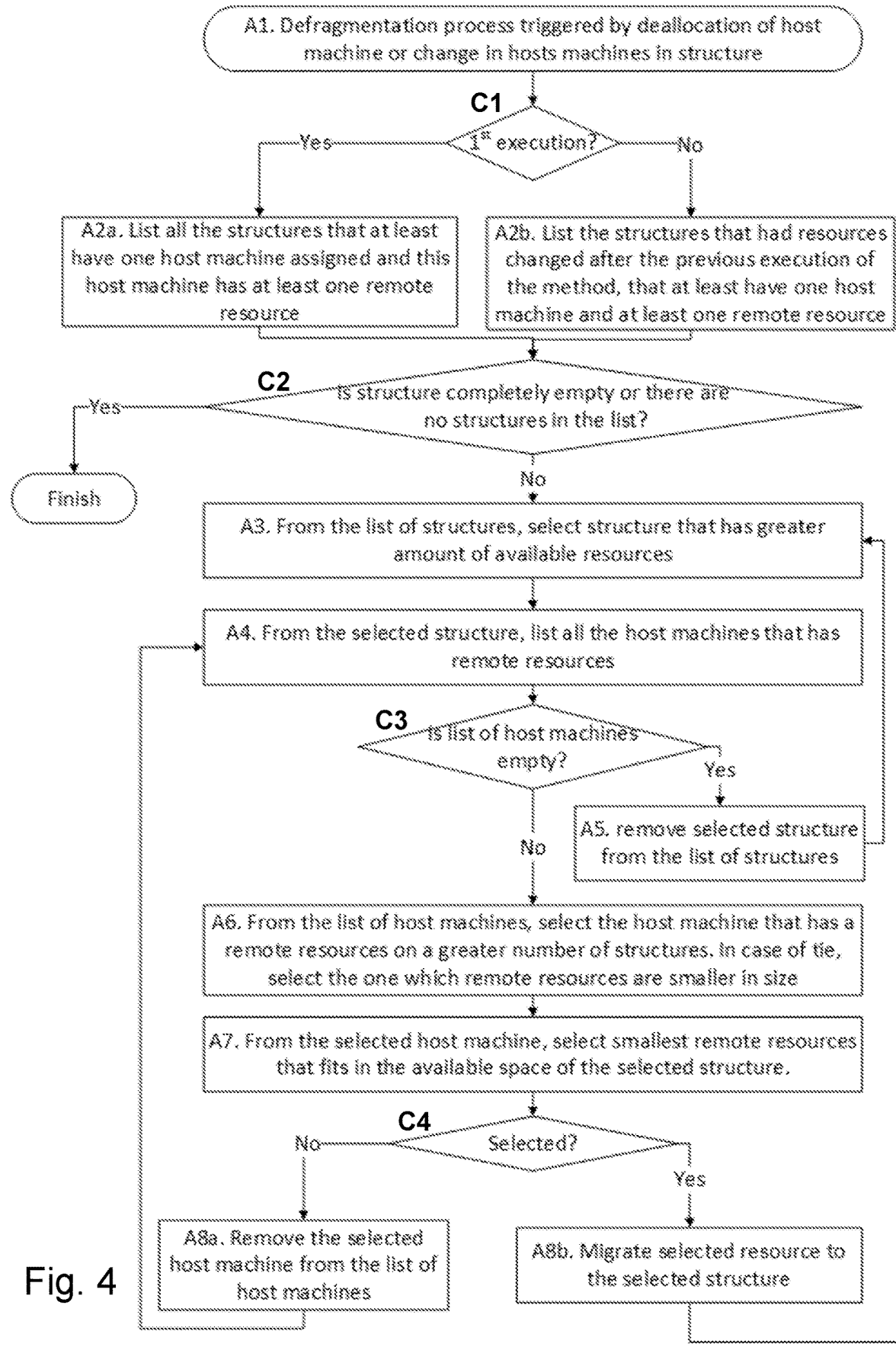
FIG. 4 is a further exemplifying flowchart illustrating embodiments of the method in the defragmentation module.

A more detailed exemplifying method, e.g. performed by the defragmentation module 110, is shown in FIG. 4. In this example, there are two types of resources, i.e. processors and memory units as examples of processing/computing resource and storage resource, respectively.

The instance manager 140 may manage, for each host machine allocated in the hardware system 100, a respective table referred to as "mapping table" herein. Hence, for each host machine, the instance manager 140 holds a respective mapping table, comprising: an identity of the respective host machine, a list of resources assigned to the respective host machine and in which structure the resources are allocated, and the like. This means that the mapping table may indicate in which structure resources of a particular host machine are allocated. E.g. the mapping table may associate one or more resource id with one or more structure numbers/identifiers for the particular host machine. The mapping table(s) may be used by the method disclosed herein as explained below.

Moreover, in some examples, there may be a structure managing module (not shown) for managing all structures or there may be a respective structure managing module (not shown) for managing of each respective structure. Any one of these structure managing modules may manage a table, referred to as "chassis configuration" herein, that maps each host machine partially hosted by a structure under study to reference(s) indicating corresponding remote resources. These structure managing modules may also, or alternatively, have access to the mapping table(s).

Actions (A) and Conditions (C) of FIG. 4 will now be described.

Action A1

The present method may be triggered by deallocation of one or more host machines or by change(s) to at least one host machine in any structure, e.g. chassis. This action is similar to action A010 above.

Condition C1

Depending on whether or not, this is the first execution of the present method action A2a or action A2b may be performed. These actions are similar to action A020 above.

Action A2a

If it is the first execution of the present method, list all structures that have, e.g. hosts, at least one host machine and this host machine has at least one remote resource. When the host machine has at least one remote resource, it means that the host machine is partially hosted by two or more structures.

Action A2b

If it is not the first execution, list the structures that had resources changed, e.g. in addition to those listed in connection with the first execution, after the first execution of the method. The listed structures may preferably have at least one host machine assigned, where said at least one host machine has at last one remote resource.

Condition C2

If there are no structures in the list, then the method is completed, i.e. proceed to finish, which may include e.g. any required cleanup procedures that may be applicable. Any structures that are found to be completely empty, i.e. some structures that are not included in the list, may be shut down, e.g. to reduce power consumption.

If the list of structures comprises more than one structure that has disjoint sets of host machines, an iteration of this method may be performed in parallel, i.e. simultaneously in case the defragmentation module is configured for parallel processing, e.g. by means of multiple processing cores or the like. A synchronization point may then be added at this step.

Action A3

From the list of structures, select a structure that has the greatest, or among the greatest, amount of available resources. This action is similar to action A030 above.

Action A4

In the selected structure, list all the host machines that have remote resources.

Condition C3

If the list of host machines is empty, then proceed to action A5, otherwise proceed to action A6.

Action A5

The list of host machines is empty. Remove selected structure from the list structures and proceed with action A2.

Action A6

The list of host machines is not empty. From the list of host machines, select the host machine that has remote resources on a greater number of structures. In case of tie, select the one which its remote resources are smaller in size. This action is similar to action A040 above.

Action A7

From the selected host machine, select smallest remote resource(s) of the selected host machine that fits in the available resources of the selected structure. Any remote resource(s) of the selected host machine that does not fit within the available resources of the selected structure may be disregarded. This action is similar to action A050 above.

Condition C4

If no remote resource, fulfilling e.g. the condition that it fits in the available resources, is found, then proceed to action A8a, otherwise proceed to action A9b.

Action A8a

If there are no remote resource(s) that fits in the available resources or the selected structure does not have enough available resources for all of remote resources in any other structure, then remove the selected host machine from the list of host machines and return to action A4.

For example, the allocated host machines in the selected structure have two host machines with 3 and 4 remote resources, respectively, in one or more other structures. But the available resources in the selected structure is 2. Therefore, the selected structure does not have enough available resources. This is case, it is thus required that the selected structure has enough available resources to allow at least one of said two host machines to become completely hosted by the selected structure due to the subsequent migration. However, as understood from the foregoing description, in other cases, it may be enough that at least one remote resource in any one other structure, but the selected structure, fits within the available resources of the selected structure.

Action A8b

Migrate all the resources, i.e. contents or data associated with the resource, from the smallest remote resource to one or more corresponding resources in the selected structure. The remote resource(s) may preferably be released.

a. For migrating processors, the processor is paused, all the registers and caches of the processor are copied to a processor on the selected structure, and then the execution is resumed in the selected structure.

b. For migrating memory, any method of live migration could be used. An example may be that the memory pages are copied in order of access. If not accessed, remaining memory pages are transferred after expiry of a time period, e.g. 2 seconds, 3 minutes or any other suitable value depending on how much time would be allowed for the migration. Higher values of the time period imply that the migration may take longer time. In case of migration of resources relating to a real-time application, it may be desired to have relatively short values of the time period, such as 10 milliseconds or even less.

After the resources have been migrated, proceed to action A2b.

This exemplifying method continues until the condition C2 cause the method to proceed to finish.

In view of the above mentioned parallel processing, it shall be noted that the defragmentation proposed herein may preferably be done in sequence when multiple host machines are allocated to resources whereof some resources are comprised in one and the same structure.

If two or more structures do not have any common host machine(s), the defragmentation may be executed in parallel as noted above in relation to condition C2. Note also that the migration of resources of a host machine from one structure to another may trigger a defragmentation process in said one structure, whose amount of available resources increase. Hence, said one structure may become the structure with a greatest, or almost greatest, amount of available resources.

In the following, a further non-limiting example is illustrated. The example is described with reference to a system in which a number of processors and memories, taken as examples of resources, of the system is kept low for reasons of simplicity. In other examples, the system may have more processors and memories in each structure. In the following, chassis is taken as an example of structure.

Now proceeding with the example, let's assume there are 4 chassis interconnected with a fast interconnect, such as the fast interconnect shown in FIG. 2. A total capacity in terms of resources for each chassis is show in Table 1.

TABLE 1

Total amount of resources in the chassis

| Chassis ID | Processors | Memory |
|---|---|---|
| C1 | 4 | 5 |
| C2 | 4 | 5 |
| C3 | 2 | 5 |
| C4 | 2 | 4 |

Initially, some allocations and deallocations may have been performed. Then, a state of the mapping table of the instance manager that contains all the host machines may be as shown in Table 2. In column "resources", the capital letter denotes a type of resource and the number in brackets is the chassis ID, where the resource is allocated. P denotes processor and M denotes memories.

TABLE 2 mapping table for host machines.

| Host machine | Resources | Number of chassis |
|---|---|---|
| A | P(C1), P(C1), P(C3), P(C4), M(C1), M(C1), M(C3), M(C3) | 3 |
| B | P(C1), P(C1), M(C1), M(C1), M(C3), | 2 |
| C | P(C3), M(C3), M(C3), M(C4) | 2 |
| D | P(C2), P(C2), P(C2), P(C2), M(C1), M(C2), M(C2), M(C2) | 2 |

Now turning to table 3 below, there is shown available resources in the exemplifying system at this stage. Here, this stage means after said some allocations and deallocations. The available resources will of course change when further allocations and deallocation as well as migration of resources due to this method are performed.

TABLE 3 available resources for each chassis at the start of this example, i.e. just after said some allocations and deallocations.

| Chassis ID | Processors | Memory |
|---|---|---|
| C1 | 0 | 0 |
| C2 | 0 | 2 |
| C3 | 0 | 0 |
| C4 | 1 | 3 |

Moreover, for each chassis, the host machines, as shown in table 4, have been allocated. Format of column "remote resources" is <host machine letter/id>: <Chassis id> (<Number processors>P, <Number Memory>M), . . . .

TABLE 4 initial chassis configuration.

| Chassis ID | Host machine | Remote resources |
|---|---|---|
| C1 | A, | A: C3 (1P, 2M), C4(1P, 0M) |
|  | B, | B: C3 (0P, 1M) |
|  | D | D: C2 (4P, 3M) |
| C2 | D | D: C1 (0P, 1M) |
| C3 | A, | A: C1 (2P, 2M), C4(1P, 0M) |
|  | B, | B: C1 (2P, 2M) |
|  | C | C: C4 (0P, 1M) |
| C4 | A, | A: C1 (2P, 2M), C3 (1P, 2M) |
|  | C | C: C3 (1P, 2M) |

Let's assume that host machine B is deallocated. This will trigger the method for defragmentation. Host machine B is thus then removed from table 2, which thus is shown as table 5 below.

TABLE 5 updated mapping table

| Host machine | Resources | Number of chassis |
|---|---|---|
| A | P(C1), P(C1), P(C3), P(C4), M(C1), M(C1), M(C3), M(C3) | 3 |
| C | P(C3), M(C3), M(C3), M(C4) | 2 |
| D | P(C2), P(C2), P(C2), P(C2), M(C1), M(C2), M(C2), M(C2) | 2 |

For purposes of illustration, state of available resources after deallocating host machine B follows here. In bold entries, illustrate increase of available resources.

TABLE 5 available resources in each chassis after deallocation of host machine B.

| Chassis ID | Processors | Memory |
|---|---|---|
| C1 | +2 | +2 |
| C2 | 0 | 2 |
| C3 | 0 | +1 |
| C4 | 1 | 3 |

Additionally, for each chassis, the host machines are allocated as follows, i.e. host machine B has been removed from Table 4 above.

TABLE 6 chassis configuration after deallocation of host machine B.

| Chassis ID | Host machine | Remote resources |
|---|---|---|
| C1 | A, D | A: C3 (1P, 2M), C4 (1P, 0M)<br>D: C2 (4P, 3M) |
| C2 | D | D: C1 (0P, 1M) |
| C3 | A, C | A: C1 (2P, 2M), C4(1P, 0M)<br>C: C4 (0P, 1M) |
| C4 | A, C | A: C1 (2P, 2M), C3 (1P, 2M)<br>C: C3 (1P, 2M) |

One or more of the following actions may be performed, while it is assumed that it is the first execution of the present method.

A2a. List of chassis (C1, C2, C3, C4)

A3: Select chassis C1, since it has more available resources. In this example, number of available processors are prioritized over number of available memories.

A4: List host machines that have remote resources in chassis 1: A, D

A6: Select host machine A, since its resources are distributed among a greater number of remote chassis than e.g. host machine D. That is, 3 for host machine A vs. 2 for host machine D.

A7. Select the smallest remote resource to migrate, i.e. search in chassis C3 and C4 for smallest remote resource: (C4 (1P, 0M)). Again, selection of smallest resource in terms of processors may be prioritized over selection of smallest resource in terms of memory.

A8b: Migrate processor, i.e. C4 (1P, 0M), of host machine A in chassis C4 to chassis C1.

After 1$^{st}$ Migration

The current state, after the first migration of resources of host machine A from chassis C4 to chassis C1, makes table 5 above turn into table 7 below.

TABLE 7 mapping table after 1$^{st}$ migration

| Host machine | Resources | Number of chassis |
|---|---|---|
| A | P(C1), P(C1), P(C3), P(C1), M(C1), M(C1), M(C3), M(C3) | 2 |
| C | P(C3), M(C3), M(C3), M(C4) | 2 |
| D | P(C2), P(C2), P(C2), P(C2), M(C1), M(C2), M(C2), M(C2) | 2 |

TABLE 8 available resources for each chassis after 1$^{st}$ migration.

| Chassis ID | Processors | Memory |
|---|---|---|
| C1 | 2 − 1 = 1 | 2 |
| C2 | 0 | 2 |
| C3 | 0 | 1 |
| C4 | 1 + 1 = 2 | 3 |

Furthermore, table 6 above is updated to table 9 below.

TABLE 9 chassis configuration after 1$^{st}$ migration

| Chassis ID | Host machine | Remote resources |
|---|---|---|
| C1 | A, D | A: C3 (1P, 2M)<br>D: C2 (4P, 3M) |
| C2 | D | D: C1 (0P, 1M) |
| C3 | A, C | A: C1 (3P, 2M)<br>C: C4 (0P, 1M) |
| C4 | C | C: C3 (1P, 2M) |

Now the method repeated.

A2b. List of chassis (C1, C2, C3, C4). The list is kept for the duration of the method, but possible updated.

A3: Select chassis C4, since it has more available resources.

A4: Host machines that have remote resources in chassis C4: C (in this case there is only one).

A6: Select host machine C.

A7: Select the smallest remote resource to migrate for host machine C: C3 (1P, 2M). In this case, there is only one other chassis in which remote resources can be found.

A8b: Migrate processor, i.e. C4 (C3 (1P, 2M), of host machine C from chassis C3 to chassis.

After 2$^{nd}$ Migration

The current state, after the second migration of resources of host machine C from chassis C3 to chassis C4, is shown in table 10, 11 and 12 below.

TABLE 10 mapping table after 2$^{nd}$ migration

| Host machine | Resources | Number of chassis |
|---|---|---|
| A | P(C1), P(C1), P(C3), P(C1), M(C1), M(C1), M(C3), M(C3) | 2 |
| C | P(C4), M(C4), M(C4), M(C4) | 1 |
| D | P(C2), P(C2), P(C2), P(C2), M(C1), M(C2), M(C2), M(C2) | 2 |

TABLE 11 available resources after 2$^{nd}$ migration.

| Chassis ID | Processors | Memory |
|---|---|---|
| C1 | 1 | 2 |
| C2 | 0 | 2 |
| C3 | 1 | 3 |
| C4 | 1 | 1 |

TABLE 12 chassis configuration after 2$^{nd}$ migration

| Chassis ID | Logical Server | Remote resources in |
|---|---|---|
| C1 | A, D | A: C3 (1P, 2M)<br>D: C2 (4P, 3M) |
| C2 | D | D: C1 (0P, 1M) |
| C3 | A | A: C1 (3P, 2M) |
| C4 | C | |

Repeat the present exemplifying method.

A2b. List of chassis (C1, C2, C3)

A3: Select chassis C3, since it has more available resources.

A4: Host machines on chassis C3 that have remote resources: A

A6: Select host machine A.

A7: It is now not possible to select any remote resource for host machine A, since remote resource is greater than available resources, i.e. 3 processors >1 available processor.

A8a. There are no more host machines in the chassis.

A5 remove selected chassis C3 from the list.

Repeat again from A2b.

A2b: List of chassis (C1, C2)

A3: Select C1, since it has more available resources.

A4: Host machine that have remote resources with respect to chassis C1: A, D

A6: Select host machine A. There is a tie to D in terms of number of chassis over which the resource are spread, but A has the smallest remote resources.

A7: Select the smallest remote resource to migrate for host machine A: C3 (1P, 2M)

A8b: Migrate processor, i.e. C3 (1P, 2M), of host machine A from chassis C3 to chassis C1.

After $3^{rd}$ Migration

The current state after the second migration of resources of host machine A from chassis C3 to chassis C1 implies that the tables are updated as follows.

TABLE 13 mapping table after $3^{rd}$ migration

| Host machine | Resources | Number of chassis |
| --- | --- | --- |
| A | P(C1), P(C1), P(C1), P(C1), M(C1), M(C1), M(C1), M(C1) | 1 |
| C | P(C4), M(C4), M(C4), M(C4) | 1 |
| D | P(C2), P(C2), P(C2), P(C2), M(C1), M(C2), M(C2), M(C2) | 2 |

TABLE 14 available resources after $3^{rd}$ migration.

| Chassis ID | Processors | Memory |
| --- | --- | --- |
| C1 | 0 | 0 |
| C2 | 0 | 2 |
| C3 | 2 | 5 |
| C4 | 1 | 1 |

TABLE 15 chassis configuration after $3^{rd}$ migration

| Chassis ID | Host machine | Remote resources |
| --- | --- | --- |
| C1 | A, D | D: C2 (4P, 3M) |
| C2 | D | D: C1 (0P, 1M) |
| C3 | | |
| C4 | C | |

A2b. List of chassis (C2). C1 is removed since does not have empty resources.

A3: Select chassis C2.

A4: Host machines that have remote resources in chassis C2: D

A6: Select host machine D.

A7: Select the smallest remote resource to migrate for host machine D: C1 (0P, 1M)

A8b: Migrate processor, i.e. C1 (0P, 1M), of host machine D from chassis C1 to chassis C2.

Final State

The current state after the third migration of resources of host machine D from chassis C1 to chassis C2 implies that the tables are updated as follows.

TABLE 16 mapping table after $4^{th}$ migration.

| Host machine | Resources | Number of chassis |
| --- | --- | --- |
| A | P(C1), P(C1), P(C1), P(C1), M(C1), M(C1), M(C1), M(C1) | 1 |
| C | P(C4), M(C4), M(C4), M(C4) | 1 |
| D | P(C2), P(C2), P(C2), P(C2), M(C2), M(C2), M(C2), M(C2) | 1 |

TABLE 17 available resources after $4^{th}$ migration.

| Chassis ID | Processors | Memory |
| --- | --- | --- |
| C1 | 0 | 1 |
| C2 | 0 | 1 |
| C3 | 2 | 5 |
| C4 | 1 | 1 |

TABLE 18 chassis mapping after $4^{th}$ migration.

| Chassis ID | Logical Server | Remote resources in |
| --- | --- | --- |
| C1 | A | |
| C2 | D | |
| C3 | | |
| C4 | C | |

A2b: The list is "empty", since no chassis partially hosts a host machine. Then the method is finished, or completed. However, the method may be run again, periodically, triggered as described in action A010 or the like.

Figure 5:
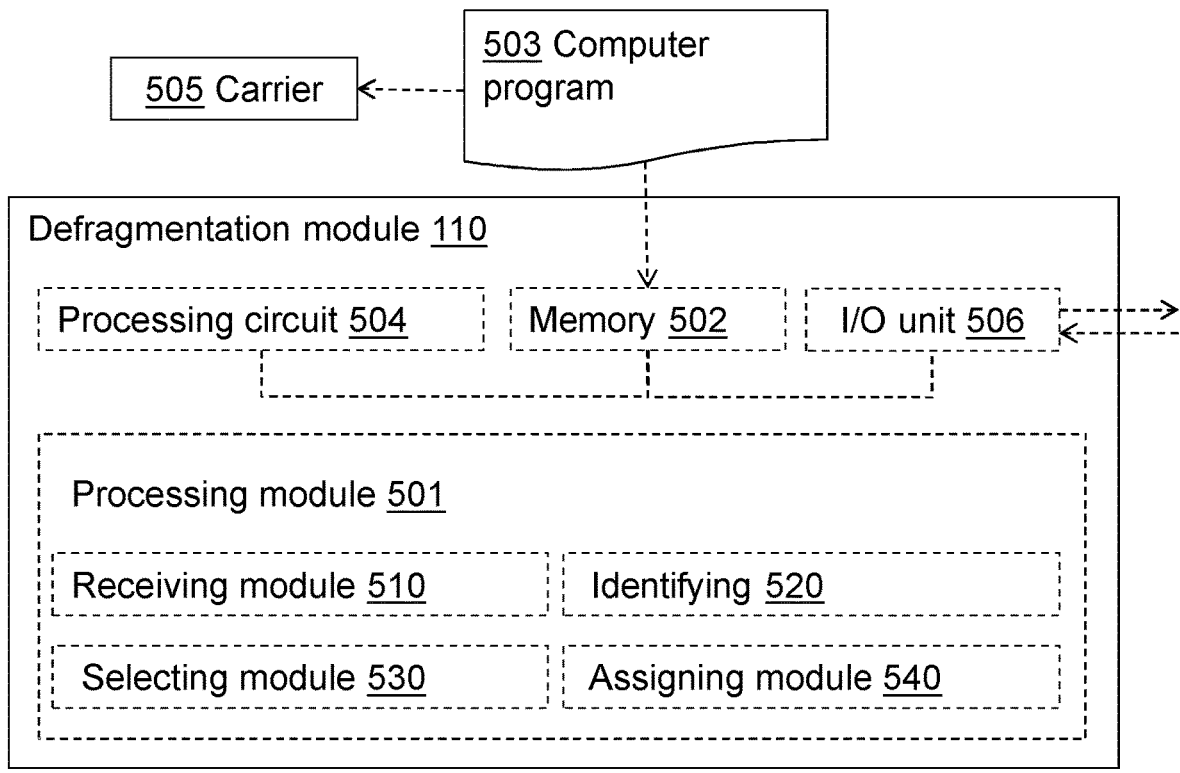
FIG. 5 is a block diagram illustrating embodiments of the defragmentation module.

With reference to FIG. 5, a schematic block diagram illustrating embodiments of the defragmentation module 110 of FIG. 2 is shown.

The defragmentation module 110 may comprise a processing module 501, such as a means for performing the methods described herein. The means may be embodied in the form of one or more hardware modules and/or one or more software modules.

The defragmentation module 110 may further comprise a memory 502. The memory may comprise, such as contain or store, instructions, e.g. in the form of a computer program 503, which may comprise computer readable code units.

According to some embodiments herein, the defragmentation module 110 and/or the processing module 501 comprises a processing circuit 504 as an exemplifying hardware module, which may comprise one or more processors. Accordingly, the processing module 501 may be embodied in the form of, or 'realized by', the processing circuit 504. The instructions may be executable by the processing circuit 504, whereby the defragmentation module 110 is operative to perform the methods of FIG. 3. As another example, the instructions, when executed by the defragmentation module 110 and/or the processing circuit 504, may cause the defragmentation module 110 to perform the method according to FIG. 3.

In view of the above, in one example, there is provided a defragmentation module 110 configured for defragmenting resources 130 of the hardware system 100. As mentioned, the hardware system 100 comprises structures 102-107 for holding the resources 130 of the hardware system 100. Again, the memory 502 contains the instructions executable by said processing circuit 504, whereby the defragmentation module 110 is operative for:

identifying the set of structures 102-107, wherein each structure 102-107 of the set of structures 102-107 partially hosts the respective set of host machines 151-153, wherein respective resources 132-133 of each host machine 151-153 of the respective set of host machines 152-153 are allocated in at least two structures of the set of structures 102-107, selecting, from the respective resources 131-133 of the host machine 151-153 of the respective set of host machine 152-153, the remote resource of the first structure being different from the second structure 104 partially hosting the host machine 151-153, wherein the remote amount of the remote resource is less than the amount of available resources of the second structure 104, and assigning the remote amount of the available resources of the second structure to the host machine 151-153 instead of the remote resource.

FIG. 5 further illustrates a carrier 505, or program carrier, which comprises the computer program 503 as described directly above.

In some embodiments, the defragmentation module 110 and/or the processing module 501 may comprise one or more of a receiving module 510, an identifying module 520, a selecting module 530, and an assigning module 540 as exemplifying hardware modules. In other examples, one or more of the aforementioned exemplifying hardware modules may be implemented as one or more software modules.

Moreover, the processing module 501 comprises an Input/Output unit 506, which may be exemplified by the receiving module and/or a sending module when applicable.

Accordingly, the defragmentation module 110 is configured for defragmenting resources 130 of the hardware system 100. As mentioned, the hardware system 100 comprises the structures 102-107 for holding the resources 130 of the hardware system 100. The resources of the hardware system 100 may comprise processing circuits and memories. Each structure 102-107 of the set of structures 102-107 may comprise at least one of a rack, a chassis, a sledge and a blade.

Therefore, according to the various embodiments described above, the defragmentation module 110 and/or the processing module 501 and/or the identifying module 520 is configured for identifying the set of structures 102-107. Each structure 102-107 of the set of structures 102-107 partially hosts the respective set of host machines 151-153. Respective resources 132-133 of each host machine 151-153 of the respective set of host machines 152-153 are allocated in at least two structures of the set of structures 102-107.

The defragmentation module 110 and/or the processing module 501 and/or the selecting module 530 is configured for selecting, from the respective resources 131-133 of a host machine 151-153 of the respective set of host machine 152-153, a remote resource of the first structure being different from the second structure 104 partially hosting the host machine 151-153. The remote amount of the remote resource is less than the amount of available resources of the second structure 104.

The defragmentation module 110 and/or the processing module 501 and/or the assigning module 530 is configured for assigning the remote amount of the available resources of the second structure to the host machine 151-153 instead of the remote resource.

The defragmentation module 110 and/or the processing module 501 and/or the selecting module 530, or another selecting module (not shown), may be configured for selecting the second structure 104 from the set of structures based on the set of amounts of available resources. Each amount of available resources of the set of amounts of available resources is associated with the respective structure of the set of structures 102-107. The set of amounts of available resources comprises the amount of available resources of the second structure 104.

The defragmentation module 110 and/or the processing module 501 and/or the selecting module 530, or a further selecting module (not shown), may be configured for selecting the second structure 104 by prioritising selection of the second structure 104 based on the amount of available processing circuits in the second structure 104 over selection of the second structure 104 based on the amount of available memories in the second structure 104.

The defragmentation module 110 and/or the processing module 501 and/or the selecting module 530, or a yet further selecting module (not shown), may be configured for selecting the remote resource by selecting the remote resource based on the remote amount of the remote resource. The remote amount of the remote resource may be one of the least amounts of remote resources of the host machine 151-153.

The defragmentation module 110 and/or the processing module 501 and/or the selecting module 530, a still further selecting module (not shown), may be configured for selecting the host machine 153 from the respective set of host machines 152-153 based on at least one of:

the number of structures 102-107 in which the respective resources of the host machine 153 are allocated, and the amount of the set of remote resources taken from the respective resources of the host machine. Each remote resource of the set of remote resources is allocated in the sub-set of structures, each structure of the sub-set of structures being different from the second structure 104.

The defragmentation module 110 and/or the processing module 501 and/or the selecting module 530, or similar module (not shown), may be configured for selecting the host machine by at least one of:

selecting the host machine 151-153 whose respective resources are allocated in a greatest, or almost a greatest, number of structures 102-107, and selecting the host machine 151-153 which has a greatest, or almost a greatest, amount of the set of remote resources.

The defragmentation module 110 and/or the processing module 501 and/or the receiving module 510 may be configured for receiving the parameter indicating that defragmentation of resources is to be performed.

The parameter may indicate one or more of:
resources have been deallocated,
a time interval has lapsed,
a number of deallocations of host machines have occurred, and
an operator of the hardware system 100 orders the defragmentation to be performed.

Figure 6:
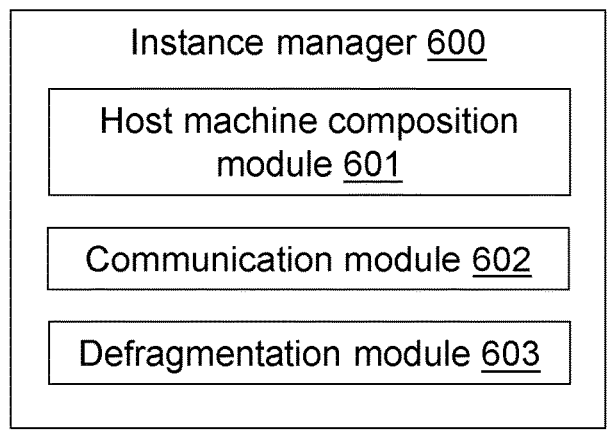
FIG. 6 is another block diagram illustrating an exemplifying instance manager.

Furthermore, in some embodiments as shown in FIG. 6, a further instance manager 600, as an example of the instance manager 140 shown in FIG. 2, may comprise a host machine composition module 601, a communication module 602 and a defragmentation module 603.

The host machine composition module 601 may be in charge of allocating resources to different host machines.

The communication module 602 may interact with requests for host machines, changes in the configuration of the resources etc.

The defragmentation module 603 may implement the method disclosed herein. The defragmentation module 603 may be an example of the defragmentation module 110 shown in FIG. 5.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for defragmenting resources being processing circuits, memories, or both processing circuits and memories, of a hardware system, wherein the hardware system comprises structures for holding the resources and a set of host machines, the method comprising:

identifying a set of structures, wherein each structure of the set of structures holds resources assigned to host machines that have other resources assigned that are held by other structures and identifying a respective set of host machines, wherein respective resources of each host machine of the respective set of host machines are allocated in at least two structures of the set of structures;
  selecting a second structure from the set of structures based on a set of amounts of available resources, wherein each amount of available resources of the set of amounts of available resources is associated with a respective structure of the set of structures, wherein the set of amounts of available resources comprises the amount of available resources of the second structure,
  selecting a host machine from the respective set of host machines, wherein the selecting the host machine comprises at least one of:
    selecting the host machine whose respective resources are held at a specified level number of structures; and
    selecting the host machine which has a specified level amount of a set of remote resources;
  selecting, from the respective resources assigned to the selected host machine, a remote resource of a first structure being different from the second structure, wherein a remote amount of the remote resource is less than an amount of available resources of the second structure; and
  assigning the remote amount of the available resources of the second structure to the host machine instead of the remote resource and migrating the remote resource to the second structure.

2. The method according to claim 1, wherein the selecting the second structure comprises prioritising selection of the second structure based on an amount of available processing circuits in the second structure over selection of the second structure based on an amount of available memories in the second structure.

3. The method according to claim 1, wherein the selecting of the remote resource comprises selecting the remote resource based on the remote amount of the remote resource.

4. The method according to claim 3, wherein the remote amount of the remote resource is one of the least amounts of remote resources of the host machine.

5. The method according to claim 1, further comprising receiving a parameter indicating that defragmentation of resources is to be performed.

6. The method according to claim 5, wherein the parameter indicates one or more of:
  resources have been deallocated;
  a time interval has lapsed;
  a number of deallocations of host machines have occurred; and
  an operator of the hardware system orders the defragmentation to be performed.

7. The method according to claim 1, wherein each structure of the set of structures comprises at least one of a rack, a chassis, a sledge and a blade.

8. A defragmentation module configured for defragmenting resources being processing circuits, memories, or both processing circuits and memories, of a hardware system, wherein the hardware system comprises structures for holding the resources and a set of host machines, wherein the defragmentation module comprising:
  a processing circuit; and
  a memory containing instructions which, when executed by the processing circuit, cause the defragmentation module to perform operations to:
    identifying a set of structures, wherein each structure of the set of structures holds resources assigned to host machines that have other resources assigned that are held by other structures and identifying a respective set of host machines, wherein respective resources of each host machine of the respective set of host machines are allocated in at least two structures of the set of structures;
    selecting a second structure from the set of structures based on a set of amounts of available resources, wherein each amount of available resources of the set of amounts of available resources is associated with a respective structure of the set of structures, wherein the set of amounts of available resources comprises the amount of available resources of the second structure,
    selecting a host machine from the respective set of host machines, wherein the select the host machine comprises at least one of:
      select the host machine whose respective resources are held at a specified level number of structures; and
      selecting the host machine which has a specified level amount of a set of remote resources;
    selecting, from the respective resources assigned to the selected host machine, a remote resource of a first structure being different from the second structure, wherein a remote amount of the remote resource is less than an amount of available resources of the second structure; and
    assign the remote amount of the available resources of the second structure to the host machine instead of the remote resource and migrate the remote resource to the second structure.

9. The defragmentation module according to claim 8, wherein the defragmentation module to select the second structure by prioritising selection of the second structure based on an amount of available processing circuits in the second structure over selection of the second structure based on an amount of available memories in the second structure.

10. The defragmentation module according to claim 8, wherein the defragmentation module to select the remote resource based on the remote amount of the remote resource.

11. The defragmentation module according to claim 10, wherein the remote amount of the remote resource is one of the least amounts of remote resources of the host machine.

12. The defragmentation module according to claim 8, wherein the instructions further cause the defragmentation module to receive a parameter indicating that defragmentation of resources is to be performed.

13. The defragmentation module according to claim 12, wherein the parameter indicates one or more of:
  resources have been deallocated;
  a time interval has lapsed;
  a number of deallocations of host machines have occurred; and
  an operator of the hardware system orders the defragmentation to be performed.

14. The defragmentation module according to claim 8, wherein each structure of the set of structures comprises at least one of a rack, a chassis, a sledge and a blade.

\* \* \* \* \*